(12) United States Patent
Fu et al.

(10) Patent No.: US 9,542,043 B2
(45) Date of Patent: Jan. 10, 2017

(54) FACILITATION OF ERROR TOLERANT IMAGE TRACING OPTIMIZATION

(71) Applicant: City University of Hong Kong, Kowloon (HK)

(72) Inventors: Hongbo Fu, Sha Tin (HK); Qingkun Su, Kowloon (HK); Wing Ho Andy Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 51 days.

(21) Appl. No.: 14/564,475

(22) Filed: Dec. 9, 2014

(65) Prior Publication Data

US 2016/0162114 A1 Jun. 9, 2016

(51) Int. Cl.
| | |
|---|---|
| *G06F 3/041* | (2006.01) |
| *G06T 7/60* | (2006.01) |
| *G06K 9/52* | (2006.01) |
| *G06T 7/00* | (2006.01) |
| *G06K 9/00* | (2006.01) |
| *G06K 9/20* | (2006.01) |
| *G06K 9/46* | (2006.01) |

(52) U.S. Cl.
CPC ........... *G06F 3/0418* (2013.01); *G06K 9/0061* (2013.01); *G06K 9/2081* (2013.01); *G06K 9/469* (2013.01); *G06T 7/0042* (2013.01); *G06T 7/0085* (2013.01); *G06T 7/60* (2013.01)

(58) Field of Classification Search
None
See application file for complete search history.

(56) References Cited

U.S. PATENT DOCUMENTS

| 9,208,403 B1* | 12/2015 | Aviv | G06K 9/6212 |
|---|---|---|---|
| 2012/0021840 A1* | 1/2012 | Johnson | A63F 13/60 463/43 |
| 2013/0121565 A1* | 5/2013 | Wang | G06K 9/6215 382/159 |
| 2015/0199584 A1* | 7/2015 | Mudge | G06K 9/4604 382/128 |
| 2015/0265236 A1* | 9/2015 | Garner | A61B 6/5217 600/425 |

* cited by examiner

*Primary Examiner* — Joseph Haley
*Assistant Examiner* — Emily Frank
(74) *Attorney, Agent, or Firm* — Amin, Turocy & Watson, LLP

(57) ABSTRACT

A stroke refinement technique can be used refine the location, orientation, and shape of input strokes by exploiting gradient features from an underlying image being traced. The technique can also be used to adjust user strokes with respect to image gradients. The stroke refinement technique can comprise a local optimization, a semi-global optimization, and a global optimization to facilitate error tolerant image optimization.

20 Claims, 12 Drawing Sheets

FACILITATION OF ERROR TOLERANT IMAGE TRACING OPTIMIZATION

TECHNICAL FIELD

This disclosure relates generally to facilitating an error tolerant image tracing leveraging multiple optimization techniques.

BACKGROUND

Freeform drawing gives artists complete freedom, but is rather difficult to master. In contrast, a technique commonly known as "under painting" provides a target image as visual guidance and allows users to paint or draw over it. This method has been widely adopted by novice users as a means to improve their drawing skills, and to generate a plausible drawing that otherwise they cannot achieve. It has also been extensively used by professionals to improve the composition and layout accuracy of their art work derived from the image.

One popular drawing style is line drawing, i.e., using abstract strokes to depict the shapes of objects in a scene. When drawing over an image, the user usually wants input strokes to be aligned with object boundaries for drawing accuracy. However, accurate tracing is easy to achieve only when it is operated under direct manipulation and an input device is accurate, e.g., tracing a printed photo with a pencil. Due to the gap between the control space and the display space, indirect interaction makes it difficult for the user to accurately express his/her intention when drawing a stroke, even if the input device (e.g., a computer mouse or even a graphic tablet like Wacom Intuos) itself is of high precision. On the other hand, when the input device is inherently inaccurate (e.g., existing touch devices), it is extremely difficult for the user to specify strokes that are accurate enough for a high quality sketch.

A stroke refinement technique that automatically refines the location, orientation, and shape of input strokes by exploiting gradient features from the underlying image being traced can be used to adjust user strokes with respect to image gradients (i.e., edge snapping). A desired image edge that the user intends to trace is often mixed with other, possibly much stronger, edges in complex image regions and is difficult to extract even with the state-of-the-art edge detectors. Although various approaches have been proposed for tackling this problem, they all face the danger of snapping to a wrong edge.

The above-described background relating to line drawing techniques is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
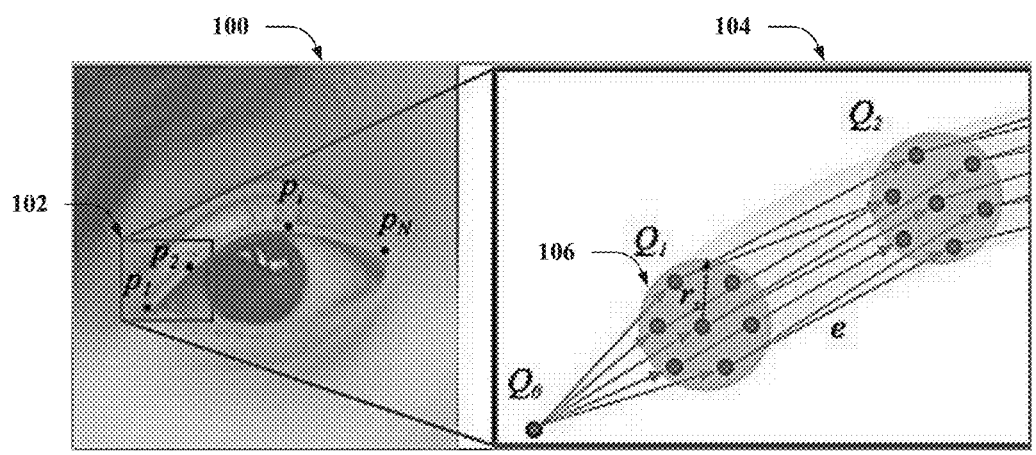
FIG. 1 illustrates a chain graph in a local optimization step according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional line drawing, various embodiments are described herein to facilitate an error tolerant image tracing optimization.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate error tolerant image tracing. While identifying a desired edge for a single stroke might be ambiguous, properly modeling the correlation among multiple input strokes in a larger image region can greatly resolve ambiguities. Therefore, optimization across three levels (local, semi-global, and global) can improve user strokes and concurrently preserve the original drawing style. Error tolerante image tracing can mitigate various sources of error, e.g., errors caused by indirect control, inaccurate touch devices, etc. Therefore, a three-level optimization method can improve user strokes based on image features.

Given a user stroke, during a local optimization technique, nearby image features can be analyzed to propose several snapping candidates. Although traditional edge snapping approaches choose one candidate as the final result as the local optimization technique does not choose just one candidate due to the inherent ambiguity in local snapping. Snapping can select various stroke edges within a set of user strokes for analysis.

Given a parameterized user stroke $s=\{p_1, p_2, \ldots, p_N\}$, where $p_i$s are stroke vertex coordinates in the image space, the goal of the local optimization step is to find several good snapping candidates, each candidate being a new stroke, which satisfy two constraints: (1) the candidates should have similar shapes to the original stroke; and (2) each candidate should align well with some structural image edges. These candidates can be represented as $s'_j=\{p'_{j,1}, p'_{j,2}, \ldots, p'_{j,N}\}$, where $j=\{1, \ldots, M\}$, and $p'_{j,i}$ is the new location of $p_i$ in the jth candidate. M is the maximum number of stroke candidates, a parameter that can be adjusted.

For each stroke point $p_i$, a local neighborhood window centered at it with radius $r_s$ is assessed for finding its snapping candidates. A small threshold (0.2 after normalization) can be applied on the image gradient magnitudes in the window to remove all pixels that have small gradient magnitudes. In the remaining pixels, the pixels that have the locally maximal gradient magnitudes (i.e., pixels whose gradient magnitudes are the greatest in 3×3 neighborhoods) and randomly sample K (≤100) positions $Q_i=\{q_{i,1}, q_{i,2}, \ldots, q_{i,K}\}$ are identified as the snapping candidates for $p_i$. A chain shaped graph G=(V,E), can then be constructed where V contains all candidate points $Q_i$. Unlike previous livewire techniques the stroke ends are not pinned in place since their initial positions might not be accurate. A virtual starting point $Q_0=\{q_{0,0}\}$, is added so that $V=\cup_0^N Q_i$, and a complete bipartite graph is constructed between two neighboring node sets $Q_i$ and $Q_{i+1}$.

The weight of each edge $e=(q_{i,k_i}, q_{i+1,k_{i+1}}) \in E$ plays an important role for the optimization process, and therefore, the input stroke can snap to nearby strong image edges that are parallel to the stroke direction. To identify such edges, inspired by a flow-based Difference-of-Gaussians (FDoG) filter a DoG filter H along the stroke direction can be defined as:

$$H(m,v)=\int_{-Y}^{Y} G_{\sigma_m}(y) \int_{-X}^{X} I(l(x,y)) f(x) dx dy, \quad (1)$$

where I is the grayscale version of the input image, m and v are the midpoint, and the unit direction vector of the graph edge e, i.e., $m=(q_{i,k_i}+q_{i+1,k_{i+1}})/2$, $v=c \cdot \overrightarrow{q_{i+1,k_{i+1}}-q_{i,k_i}}$, where c is the normalization factor. $l(x,y)=m+xu+yv$, u is the unit vector that is perpendicular to v. $f(x)=G_{\sigma_c}(x)-\rho G_{\sigma_s}(x)$ is the difference of two Gaussian functions. H(m,v) thus can effectively find image edges that are parallel to the local stroke direction v, thus better capturing the user's intention. Thus, the local filter direction is no longer determined by the image features, but provided by the user stroke.

The filtering response can then be converted H(m,v) into an edge weight term as:

$$\tilde{H}(m, v) = \begin{cases} 1 + \tanh(H(m, v)) & \text{if } H(m, v) < 0, \\ 1 & \text{otherwise} \end{cases} \quad (2)$$

Specifically, if the middle point m is on an image edge whose direction is close to v, H(m,v) will be a large negative value, thus $\tilde{H}(m,v)$ in Equation 2 will be close to zero, leading to a small edge weight. On the contrary, an edge that is perpendicular to v will lead to a large edge weight, thus would not be preferred in this energy minimization framework.

After local snapping, the shape and position of the input stroke would not change dramatically and can be achieved by adding another term in the edge weight that penalizes the shifts of vertices. Combining these two terms, the total edge weight $w_e$ is defined as:

$$w_e = \frac{1}{r_s^2} \|(p_{i+1} - p_i) - (q_{i+1,k_{i+1}} - q_{i,k_i})\|_2^2 + \alpha \tilde{H}_-(m, v), \quad (3)$$

where $\alpha$ is a balancing weight.

An iterative approach to search for snapping candidates can also be utilized by targeting a small number of candidates with large variations. First, with a constructed graph G=(V,E), the best snapping position $s_1'$ of the user stroke s can be computed by finding the shortest path $(q_{0,0}, q_{1,k_1}, q_{2,k_2}, \ldots, q_{n,k_N})$ from $Q_0$ to $Q_N$, with the total energy of a path defined as the sum of edge weights along the path. This problem can be effectively solved using dynamic programming. Second, two conditions can be checked: a) whether the average edge weight of $s_1'$ is small enough (≤0.07); b) whether $s_1'$ is significantly different from the existing ones (This is achieved by computing the average distance between the corresponding vertices of the new candidate and existing ones. The condition is true only if the distance is large enough ($>r_s/4$). $s_1'$ can be added to the final set of candidates only if both conditions are true. The first condition helps filter out snapping candidates with low confidence. Note that it is possible that no snapping candidates satisfy this condition, which will leave the input stroke s not to be adjusted until the global optimization step. The second condition can encourage the selected candidates to have large variations. Third, no matter whether $s_1'$ is selected or not, all edges in $s_1'$ will be removed from the graph. The removal of almost identical candidates lowers the computational cost for future steps. The above three steps can be repeated until at most M candidates are identified.

The local optimization step can yield multiple snapping candidates for some user strokes. However, determining the right candidate from the multiple candidate is sometimes ambiguous if only a single stroke is considered. To facilitate a semi-global optimization, once the snapping candidates of a new stroke are determined, the current stroke and its spatial-temporal neighboring strokes can be jointly optimized to determine their optimal snapping results together. The nearby strokes can influence candidate selection decisions to produce a locally consistent result.

Although, considering multiple strokes together is beneficial, optimizing too many strokes together can introduce stability and convergence problems to the system. If all user strokes were optimized, the system would become uncontrollable, as any new stroke the user adds would alter the existing results, even in faraway regions that have nothing to do with the local area that the user is focusing on at this moment. To avoid this problem the system can consider spatio-temporal neighboring strokes of the current user stoke. Thus, every new user stroke will invoke a semi-global optimization procedure, and only those strokes that are both spatial and temporal neighbors of the new one are considered.

The temporal neighboring relationship can be determined by the drawing order, where the most recently three strokes can be considered as the temporal neighbors of the new stroke. To determine if they are spatially close to the new stroke a distance of the closest vertex on a neighboring stroke to each vertex of the new stroke can be recorded. If more than 30% of such distances are smaller than $1.5 \cdot r_s$, the strokes can be treated as spatial neighbors. The current user stroke and its valid spatio-temporal neighbors can be labeled as an active stroke set, denoted as $S=\{s_1, s_2, \ldots, s_m\}$, and their candidate set $C=\{c(i,j)\}$, where $c(i,j)$ means the jth candidate of the ith stroke $s_i$.

A candidate combination can be represented by $T=\{c(1,j_1), c(2,j_2), \ldots, c(m,j_m)\} \subset C$ which satisfies the following three constraints: (1) each selected candidate has a small snapping cost in local optimization; (2) their spatial layout is similar to S; and (3) T should not introduce new conflicts with other strokes that are not involved in the current optimization step. Thus, an energy term can be defined to describe each of the three constraints.

The sum of the snapping costs can be defined as $E_g$ (T) and computed during the local optimization (i.e., edge weights $W_e$ defined in Equation 3) for snapping candidates in T. By minimizing this term, the first constraint is satisfied.

To encourage layout consistency between S and T, a 2D mesh M is defined by connecting each vertex $p_i$ in S to its spatially neighboring vertices. Consequently, the resulting mesh is not necessarily a triangular mesh. Similarly, a corresponding mesh defined by M', can connect each vertex $c_i$ in T to its spatial neighboring vertices. Two energy terms can then be defined as:

$$E_r(T) = \sum_{e_{ij} \in M} \eta \|(p_i - p_j) - (c_i - c_j)\|_2^2, \quad (4)$$

$$E_b(t) = \sum_{i \in \phi_S} \eta \|p_i - c_i\|_2^2,$$

where $\eta = 1/r_s^2$. $E_r(T)$ corresponds to the second constraint and measures the mesh deformation that is covered by S. $E_b(T)$ measures the mesh deformation along the boundary of S, where $\phi_S$ contains all boundary vertices of S, i.e., vertices that are connected with strokes that are not involved in the current optimization step in the mesh M. Minimizing this term can encourage the boundary vertices of S to stay at the same positions, thus avoiding introducing conflicts with other nearby strokes.

Combining the three terms together, the final energy minimization problem can be defined as:

$$\min_{T \subset C} E_g(T) + \beta(E_r(T) + E_b(T)), \quad (5)$$

where $\beta$ is a balancing weight.

Given that the size of T is limited (the active stroke set can contain at most three strokes in our implementation) and all energy terms can be computed efficiently, an exhaustive search can be used to find the globally optimal solution to Equation 5. The exhaustive search can be done effectively in real-time. Increasing the size of T could potentially slow down the computation. However as discussed earlier, the size of T can be intentionally limited to avoid the convergence problem and provide a better user experience.

The semi-global optimization can simultaneously adjust nearby strokes to achieve a semantically-compatible result. In contrast, without the semi-global optimization, local optimization alone cannot find the optimal snapping positions for all strokes, leading to a less satisfactory result.

Strokes with no snapping candidates can be adjusted with respect to those with snapping candidates via a global optimization based on an existing mesh deformation technique, to preserve the overall stroke layout. As discussed previously, some strokes might remain untouched during the semi-global optimization step, since their corresponding snapping energy is too high and thus they have no snapping candidate. Such strokes can be present in the scenario where the user intentionally does not want to follow any image edges at all, e.g., when making hatching-like effects or applying decorative strokes.

However, since other strokes are adjusted with snapping candidates, there is a potential topology issue: an adjusted stroke may cross some nearby untouched strokes that have been drawn earlier, which is undesirable. To avoid this problem, the global optimization step is used to adjust the positions of strokes with no snapping candidate so that the overall stroke topology remains unchanged, and the user's drawing style is better preserved. The intent is to preserve the original global layout of untouched strokes while responding to the change of strokes with snapping candidates.

The global optimization is achieved using a 2-dimensional deformation approach that is similar to the one used in the semi-global optimization step. However, it is worth emphasizing that the semi-global optimization essentially performs selection rather than deformation. All the original strokes with snapping candidates as S and their refined positions as T, can be used to triangulate the image plane using all stroke vertices, and compute a mesh deformation according to the mapping from S to T. The computed deformation field can then be used to move strokes with no snapping candidate to their adjusted positions.

In one embodiment, described herein is a method comprising identifying a stroke associated with an image, and identifying a point and radius of the stroke. The method can next apply a condition related to an image gradient magnitude, remove a pixel in response to the condition being satisfied and sample a position associated with the pixel during a local optimization process.

According to another embodiment, a system can facilitate the determining of a subset of strokes based on a closet vertex and facilitate the recording of a distance between a stroke and a neighboring stroke. The system can also facilitate the determining of the subset of strokes based on a condition related to the distance and then facilitate the selection of a stroke associated with the subset of strokes.

According to yet another embodiment, described herein is a computer readable medium that can perform the operations comprising determining a subset of strokes related to an image and determining a closest vertex related to a neighboring stroke. The distance between the stroke and the neighboring stroke can then be recorded and used to determine if a condition has been satisfied. Furthermore, the image plane can then be triangulated based on a stroke vertex and a mesh deformation can be determined based on a position of the subset of strokes and a spatial neighboring criterion.

These and other embodiments or implementations are described in more detail below with reference to the drawings.

Referring now to FIG. 1, illustrated is a chain graph in a local optimization step according to one or more embodiments. The original image 100 can have several stroke points represented by $p_1, p_2, \ldots, p_N$. The extrapolated graph 104 is an expanded view of the stroke points found in a defined region 102. The extrapolated graph 104 can comprise a local neighborhood window 106 with a radius $r_s$, wherein snapping candidates are found within the radius. The neighborhood can be defined according to stroke points that are spatially related or near each other. $Q_i$ can represent a random sampling of a number of snapping candidates for $p_i$, where $p_i$ is any stroke point being assessed.

Figure 2:
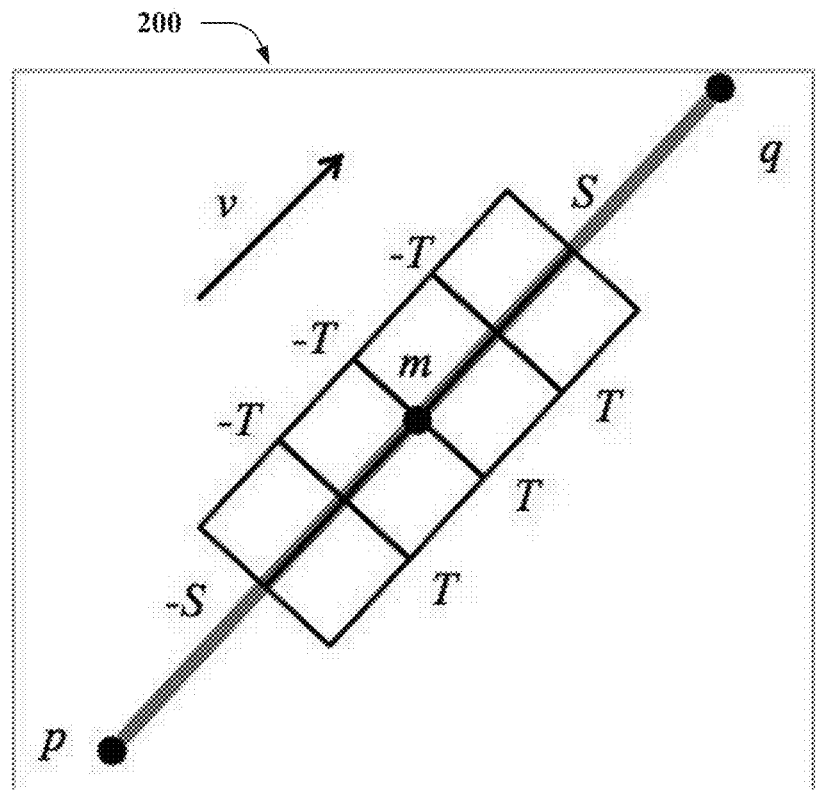
FIG. 2 illustrates a stroke edge direction for a filter between two candidate vertices according to one or more embodiments.

Based on the aforementioned information, a chain graph can be constructed as G=(V,E), where V contains all candidate points $Q_i$. A virtual starting point $Q_0 = \{q_{0,0}\}$ can be added, as shown in FIG. 1, so that $V = \cup_0^N Q_i$. Thus, a complete bipartite graph can be constructed between two neighboring node sets $Q_i$ and $Q_{i+1}$. Furthermore, the weight of each edge $e = (q_{i,k_i}, q_{i+1,k_{i+1}}) \in E$ can play an important role in the optimization process Referring now to FIG. 2, illustrated is a stroke edge direction for a filter between two candidate vertices according to one or more embodiments. The input stroke can snap to nearby strong image edges, in relation to the weight of each edge $e = (q_{i,k_i}, q_{i+1,k_{i+1}}) \in E$, that are parallel to the stroke direction. Thus a difference-of-Gaussians filter can be defined along the stroke direction as represented in Equation 1, where I can be the gray scale version of the input image.

m and v can be the midpoint and the unit direction vector, respectively, of the graph edge e. m can be defined as $m=(q_{i,k_i}+q_{i+1,k_{i+1}})/2$ and v can be defined as $v=c \cdot \overrightarrow{q_{i+1,k_{i+1}}-q_{i,k_i}}$, where c is the normalization factor and $l(x, y)=m+xu+yv$, with u being a unit vector perpendicular to v.

Figure 3:
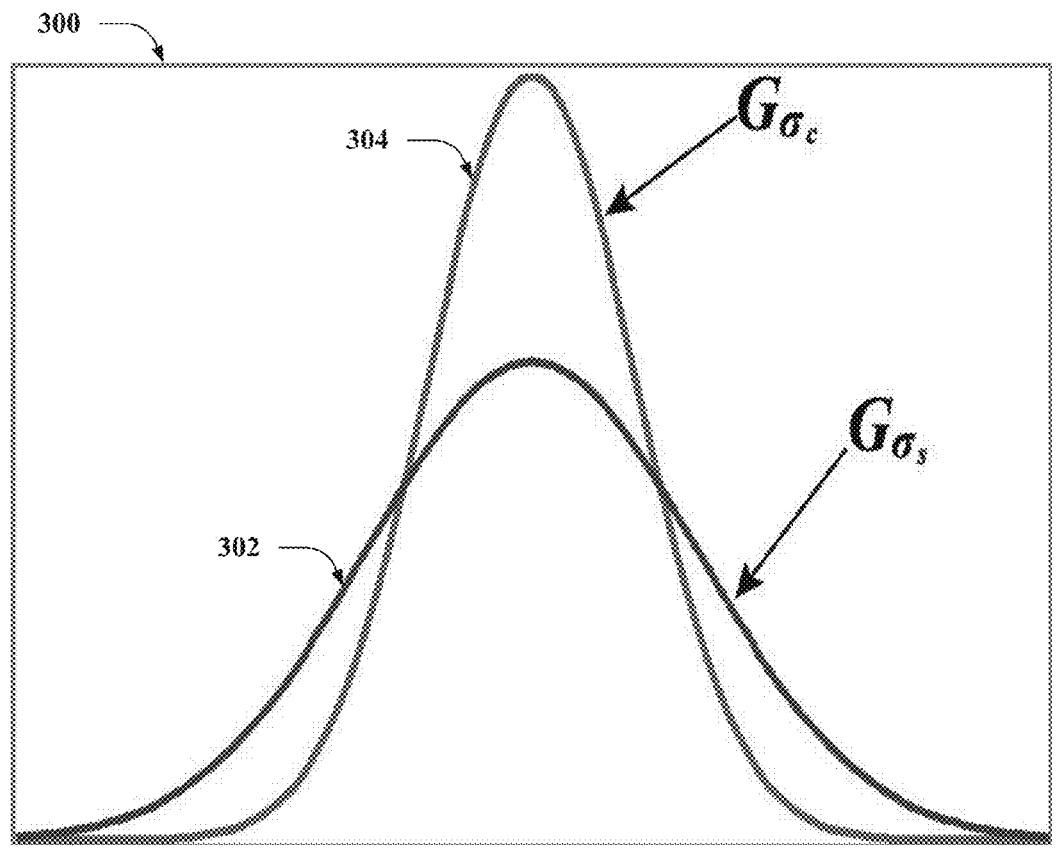
FIG. 3 illustrates a Difference-of-Gaussians filter to locate edges that are roughly parallel a local stroke direction according to one or more embodiments.

Referring now to FIG. 3, illustrated is a difference-of-Gaussians filter to locate edges that are roughly parallel a local stroke direction according to one or more embodiments. An image 300 as a function of x is defined as $f(x)=G_{\sigma_c}(x)-\rho G_{\sigma_s}(x)$ and represents the difference of the two Gaussian functions $G_{\sigma_c}$ 304 and $G_{\sigma_s}$ 302 based on the area between the parabolic intersections. Therefore, the local filter direction is no longer determined by the image features, but rather, provided by the user stroke.

Figure 4:
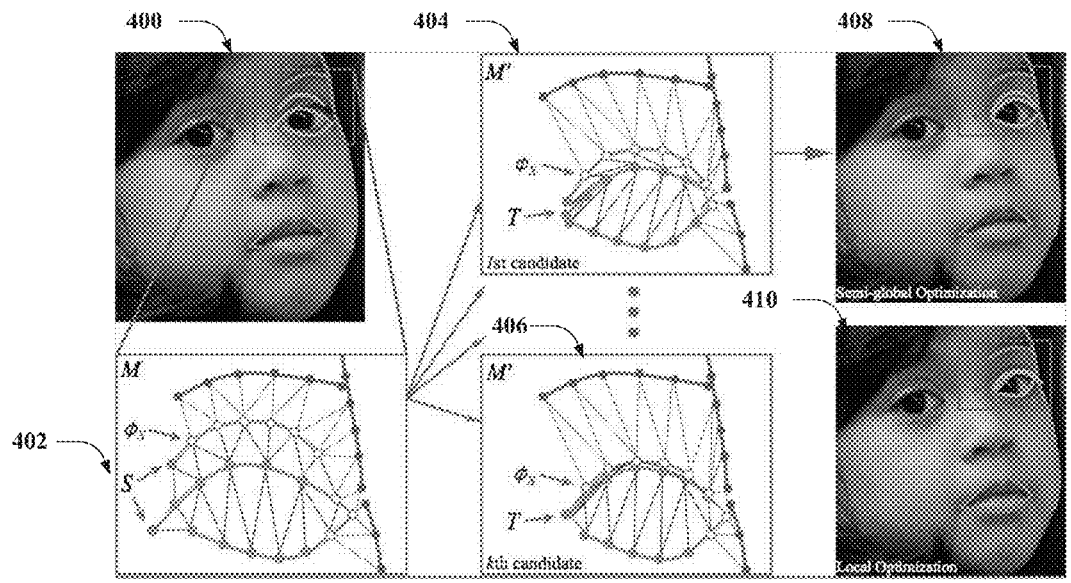
FIG. 4 illustrates a connection of stroke vertices to create a local mesh in a local region according to one or more embodiments.

Referring now to FIG. 4, illustrated is a connection of stroke vertices to create a local mesh in a local region according to one or more embodiments. A local region 402 of an image view is exploded based upon an original image 400 during a semi-global optimization process. A local mesh M can be created by connecting the vertices of the strokes shown within the local region. Based upon an active stroke set and several corresponding meshes, candidate combinations 404 406 can be determined. Although only candidate combinations 404 406 are depicted in FIG. 4, several candidate combinations can be determined. A candidate combination can then be selected based on a minimum energy equation represented by Equation (5) above. The selected candidate combination can be the combination representative of the semi-global optimization image 408. Consequently, a visual comparison can be performed between the semi-global optimization image 408 and the local optimization image 410.

Figure 5:
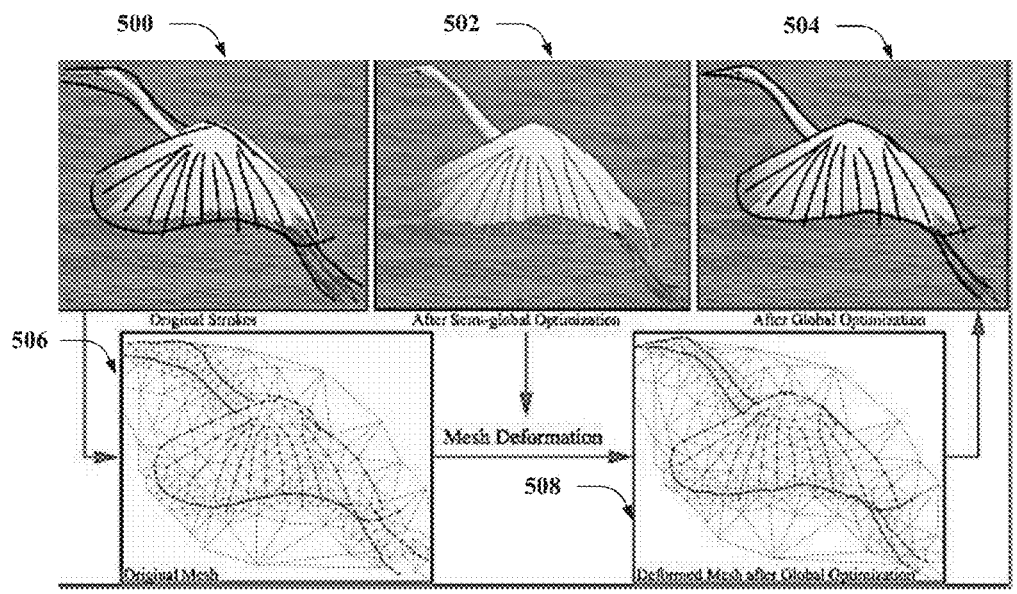
FIG. 5 illustrates adjusted strokes with no snapping candidate with respect to strokes with snapping candidates according to one or more embodiments.

Referring now to FIG. 5, illustrated is an adjusted stroke with no snapping candidate with respect to strokes with snapping candidates according to one or more embodiments. A global optimization can be used to avoid a topology issue when strokes are adjusted with snapping candidates. Since an adjusted stroke may cross some nearby untouched strokes that have been drawn earlier, the global optimization can be leveraged to adjust the positions of strokes with no snapping candidates so that the overall stroke topology remains unchanged.

The original image 500 is shown with the original strokes. An original mesh image 506 is generated based on the stroke points related to the strokes shown in the original image 500. A 2-dimensional deformation approach can be used to triangulate the original mesh image plane using all stroke vertices and compute a mesh deformation according to a mapping of snapping candidates to their refined positions. The computed deformation field can then be used to move strokes with no snapping candidates to an adjusted position. Data from the semi-global optimization image 502 can be combined with mesh deformation data based on the original mesh image 506 and then used to compose a deformed mesh after global optimization image 508. Deformed mesh after global optimization image 506 data can then used to construct an image after global optimization 504.

Figure 6:
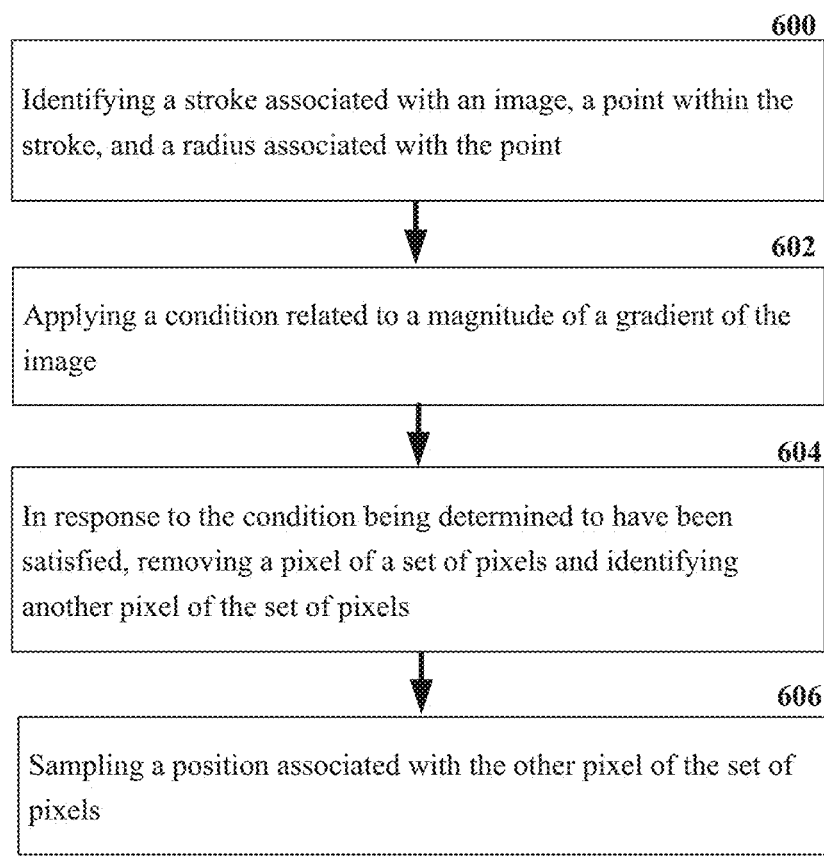
FIG. 6 illustrates a schematic system block diagram of a local optimization according to one or more embodiments.

Referring now to FIG. 6, illustrated is a schematic system block diagram of a local optimization according to one or more embodiments. At element 600 a stroke associated with an image, a point within the stroke, and a radius associated with the point are identified. Identifying the stroke, point, and radius can be used to identify snapping candidates. At element 602 a condition related to a magnitude of a gradient of the image can be applied. A threshold can be applied to the magnitude of the gradient of the image, in a local neighborhood window, to remove pixels that have small gradient magnitudes. In response to the condition being determined to have been satisfied a pixel of a set of pixels can be removed and another pixel of the set of pixels can be identified at element 604. Once the pixels with small gradient magnitudes have been removed, pixels with locally maximal magnitude gradients can be identified. At element 606 a position associated with the other pixel of the set of pixels can be sampled to determine a snapping candidate.

Figure 7:
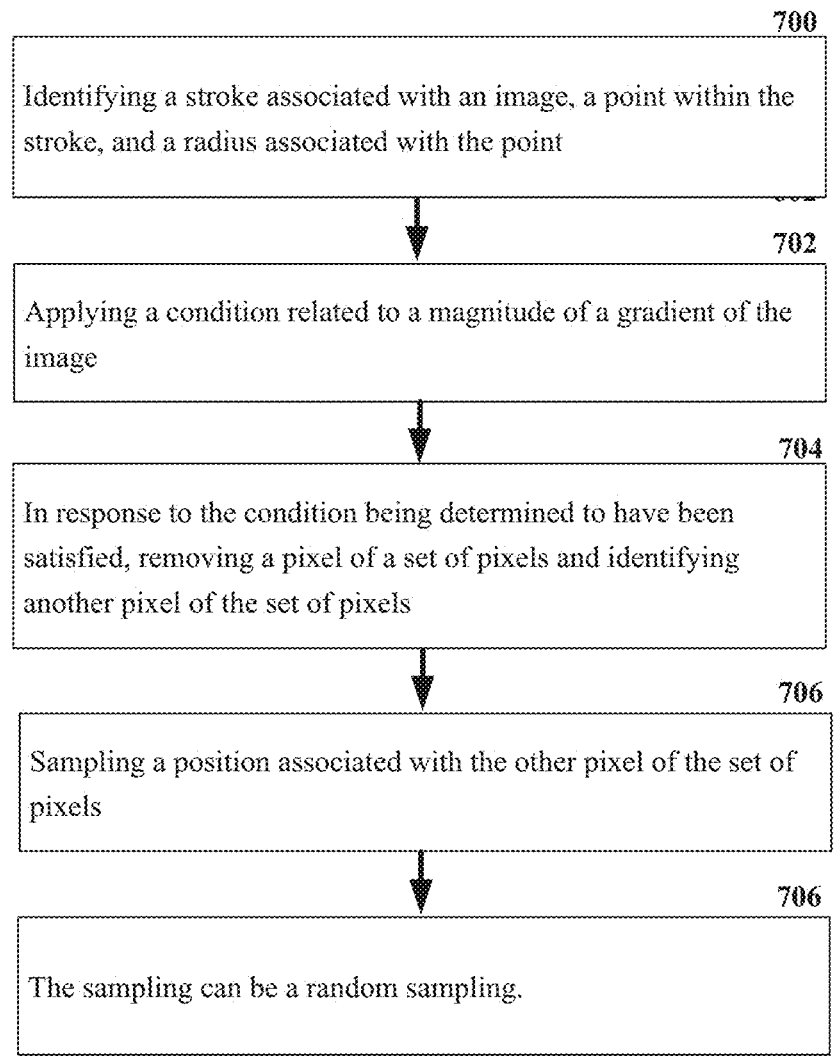
FIG. 7 illustrates a schematic system block diagram of a local optimization comprising a random sampling according to one or more embodiments.

Referring now to FIG. 7, illustrated is a schematic system block diagram of a local optimization comprising a random sampling according to one or more embodiments. At element 700 a stroke associated with an image, a point within the stroke, and a radius associated with the point are identified. Identifying the stroke, point, and radius can be used to identify snapping candidates. At element 702 a condition related to a magnitude of a gradient of the image can be applied. A threshold can be applied to the magnitude of the gradient of the image, in a local neighborhood window, to remove pixels that have small gradient magnitudes. In response to the condition being determined to have been satisfied a pixel of a set of pixels can be removed and another pixel of the set of pixels can be identified at element 704. Once the pixels with small gradient magnitudes have been removed, pixels with locally maximal magnitude gradients can be identified. At element 706 a position associated with the other pixel of the set of pixels can be sampled to determine a snapping candidate. At element 708, the sampling can be a random sampling.

Figure 8:
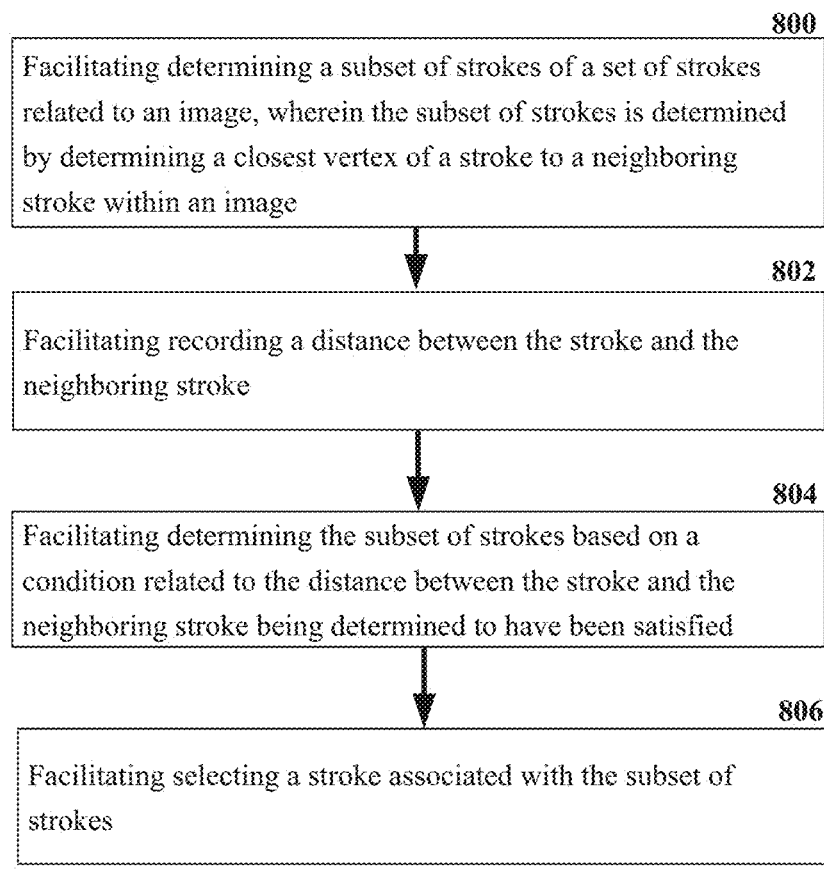
FIG. 8 illustrates a schematic system block diagram of a semi-global optimization according to one or more embodiments.

Referring now to FIG. 8, illustrated is a schematic system block diagram of a semi-global optimization according to one or more embodiments. At element 800 a subset of strokes of a set of strokes related to an image is determined. The subset of strokes is determined by determining a closest vertex of a stroke to a neighboring stroke within the image. A temporal neighboring relationship is determined by drawing order of consecutive strokes. If the previous strokes are spatially close to a new stroke, a distance of each vertex on the new stroke to the closest vertex of a neighboring stroke can be recorded at element 802. At element 804 the subset of strokes can be determined based on a condition related to the distance between the stroke and the neighboring stroke being determined to have been satisfied. If a percentage of a number of distances is smaller than another number associated with a radius, then the strokes can be treated as spatial neighbors. Based on a determination of spatial neighboring, a snapping candidate associated with the subset of strokes can be selected at element 806. The selected snapping candidate can satisfy three constraints: (1) each selected snapping candidate can have a small snapping cost in a local optimization; (2) the spatial layout is similar to the active stroke set; and (3) the snapping candidate combinations should not introduce new conflicts with other strokes which are not involved in the current optimization step.

Figure 9:
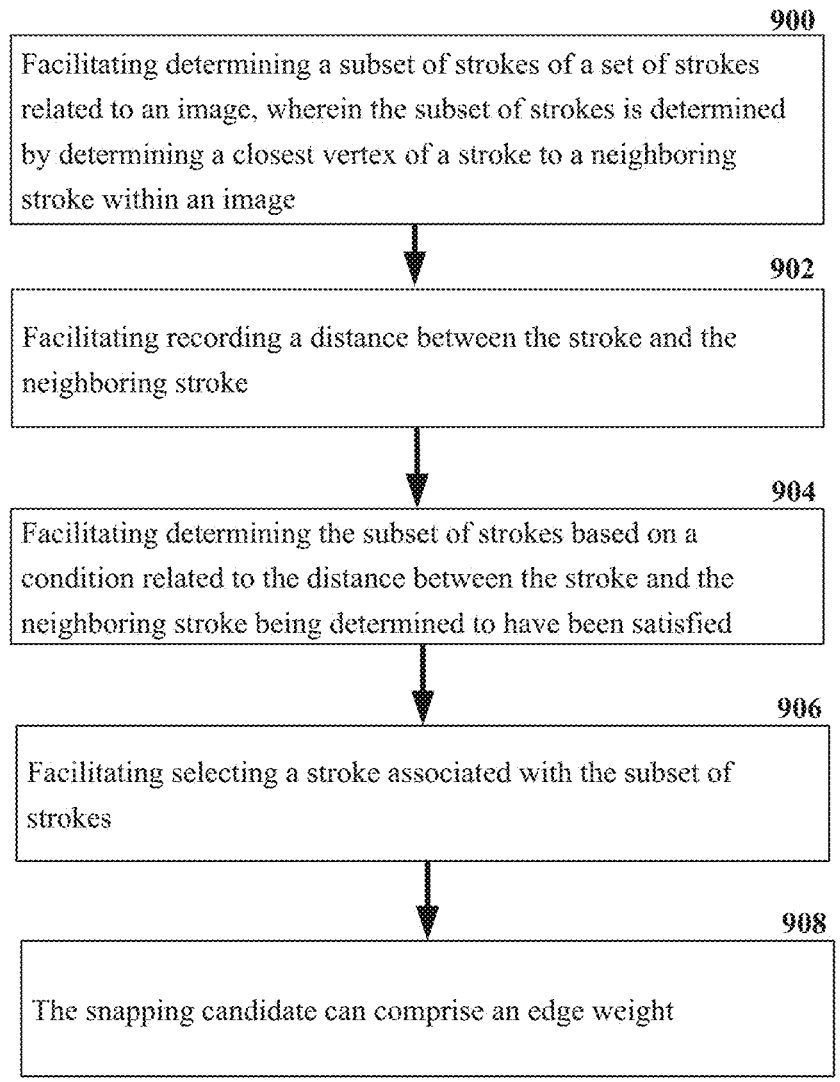
FIG. 9 illustrates a schematic system block diagram of a semi-global optimization comprising an edge weight according to one or more embodiments.

Referring now to FIG. 9, illustrated is a schematic system block diagram of a semi-global optimization comprising an edge weight according to one or more embodiments. At element 900 a subset of strokes of a set of strokes related to an image is determined. The subset of strokes is determined by determining a closest vertex of a stroke to a neighboring stroke within the image. A temporal neighboring relationship is determined by drawing order of consecutive strokes. If the previous strokes are spatially close to a new stroke, a distance of each vertex on the new stroke to the closest vertex of a neighboring stroke can be recorded at element 902. At element 904 the subset of strokes can be determined based on a condition related to the distance between the stroke and the neighboring stroke being determined to have been satisfied. If a percentage of a number of distances is smaller than another number associated with a radius, then the strokes can be treated as spatial neighbors. Based on a determination of spatial neighboring, a snapping candidate associated with the subset of strokes can be selected at element 906. The selected snapping candidate can satisfy three constraints: (1) each selected snapping candidate can have a small snapping cost in a local optimization; (2) the spatial layout is similar to the active stroke set; and (3) the snapping candidate combinations should not introduce new conflicts with other strokes which are not involved in the current optimization step. At element 908 the snapping candidate can comprise an edge weight as represented by Equation (3).

Figure 10:
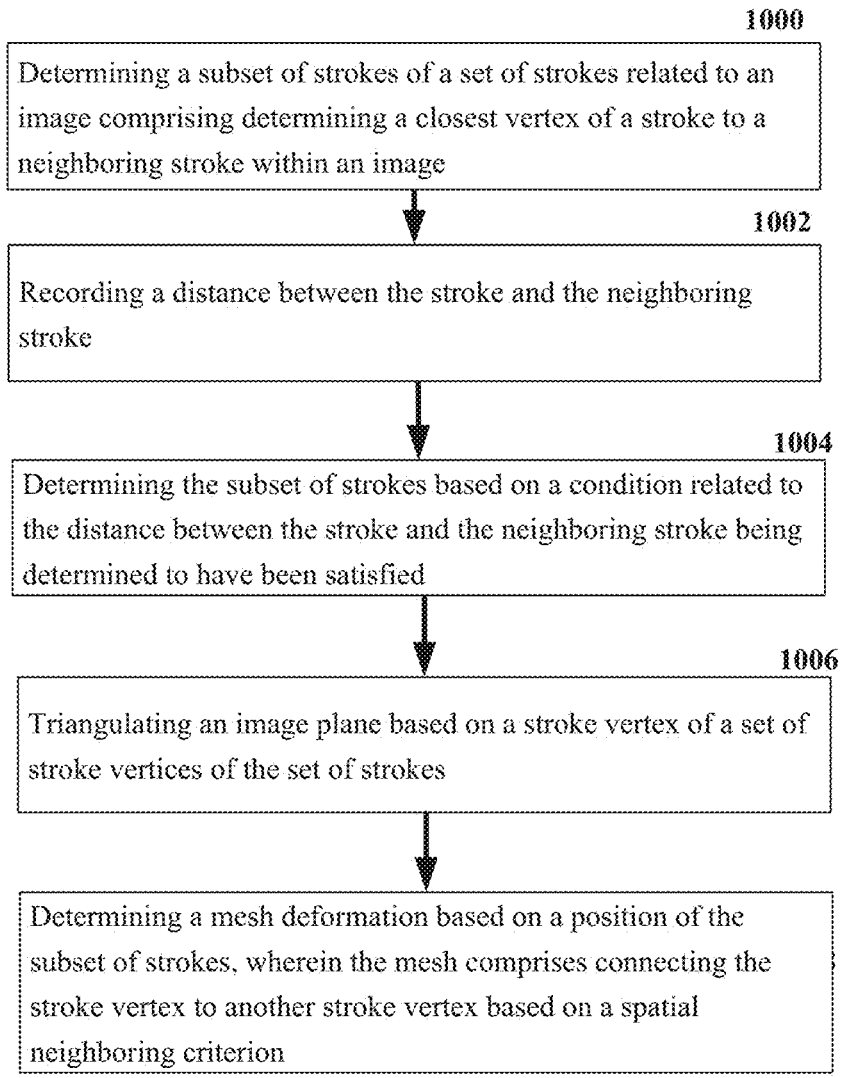
FIG. 10 illustrates a schematic system block diagram of a global optimization according to one or more embodiments.

Referring now to FIG. 10, illustrated is a schematic system block diagram of a global optimization according to one or more embodiments. At element 1000 a subset of strokes of a set of strokes related to an image is determined and also comprises a determining of a closest vertex of a stroke to a neighboring stroke within an image. A temporal neighboring relationship is determined by drawing order of consecutive strokes to the new stroke. If the previous strokes are spatially close to a new stroke, a distance of each vertex on the new stroke to the closest vertex of a neighboring stroke can be recorded at element 1002. At element 1004 the subset of strokes can be determined based on a condition related to the distance between the stroke and the neighboring stroke being determined to have been satisfied. If a percentage of a number of distances is smaller than another number associated with a radius, then the strokes can be treated as spatial neighbors. At element 1006 an image plane based on a stroke vertex of a set of stroke vertices of the set of strokes can be triangulated. Consequently, a mesh deformation based on a position of the subset of strokes can be determined at element 1008. The mesh can be created by connecting the stroke vertex to another stroke vertex based on a spatial neighboring criterion.

Figure 11:
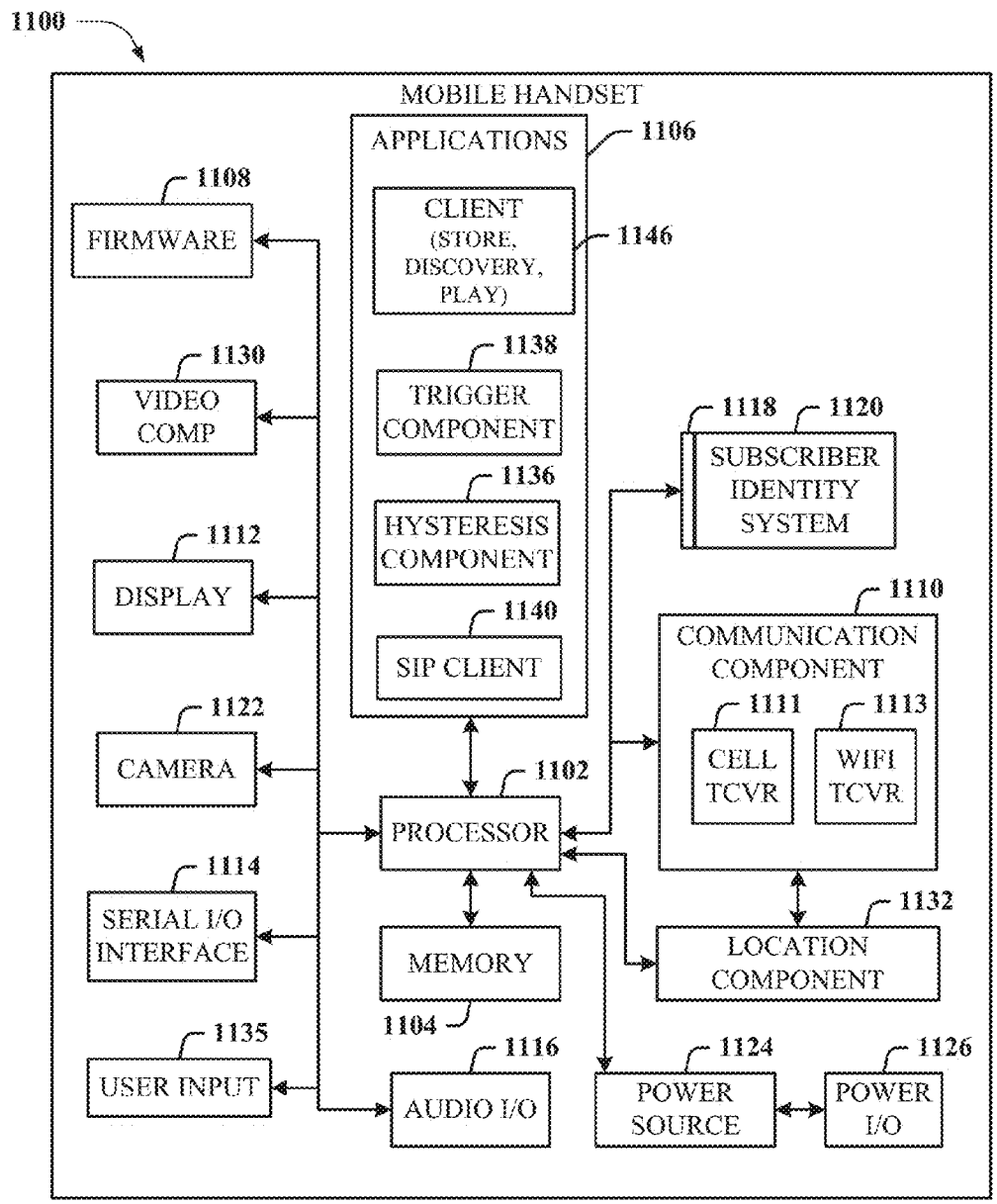
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1000 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
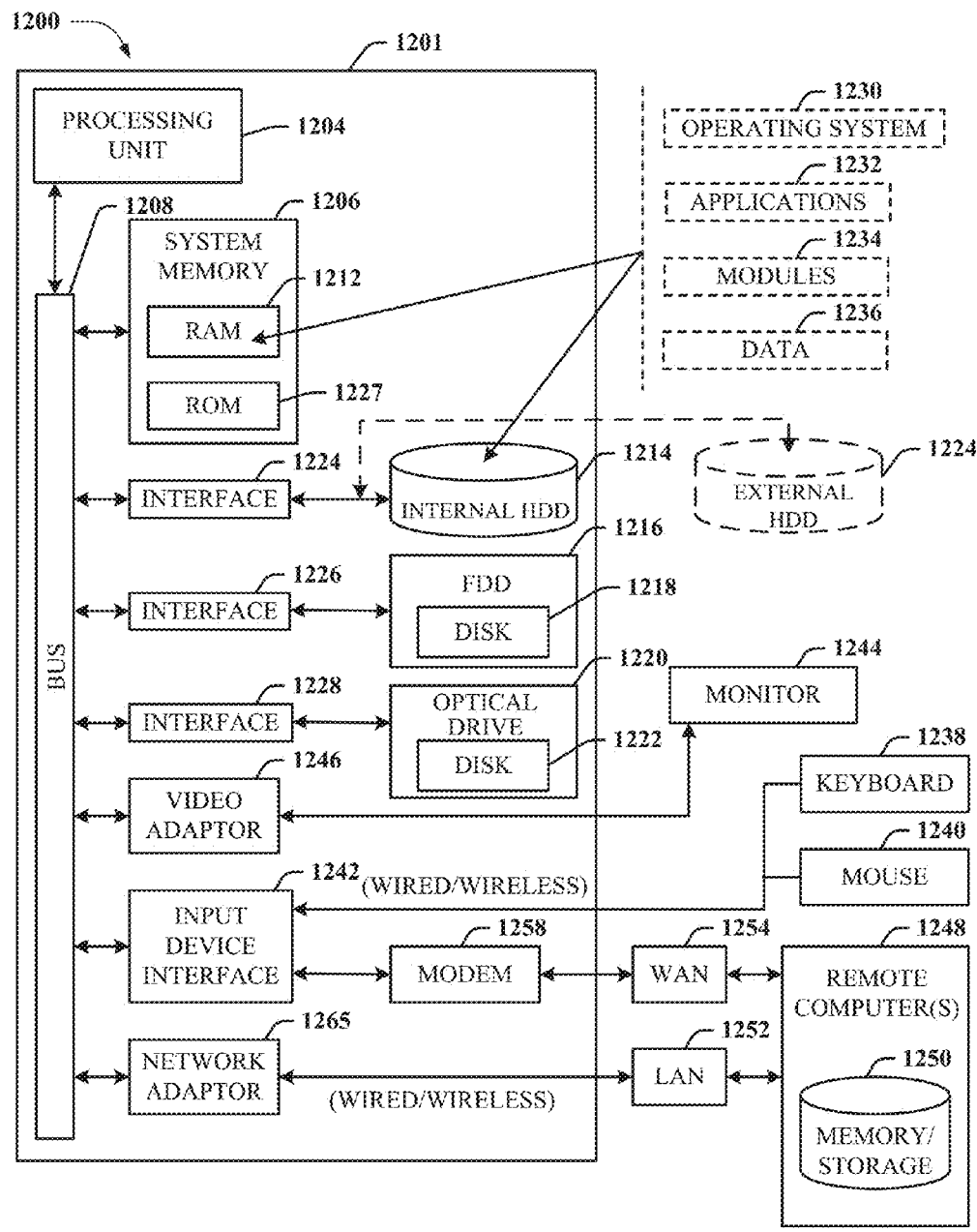
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by a network device comprising a processor, a stroke associated with an image, a point within the stroke, and a radius associated with the point, wherein the stroke snaps to an image edge that is parallel to a stroke direction of the stroke resulting in the stroke being positioned near the image edge;
   applying, by the network device, a condition related to a magnitude of a gradient of the image;
   in response to the condition being determined to have been satisfied, removing, by the network device, a pixel of a set of pixels and identifying, by the network device, another pixel of the set of pixels; and
   sampling, by the network device, a position associated with the other pixel of the set of pixels.

2. The method of claim 1, wherein the sampling is a random sampling.

3. The method of claim 1, wherein the sampling comprises a determination of a snapping candidate, and wherein the snapping candidate is determined based on a stroke adjustment with respect to the gradient of the image.

4. The method of claim 3, wherein the snapping candidate is determined to be of a similar shape to the stroke associated with the image according to a defined similarity function.

5. The method of claim 3, wherein the snapping candidate aligns with an edge of the image.

6. The method of claim 3, wherein the condition is a first condition, and wherein the method further comprises applying a second condition associated with a number of snapping candidates associated with the stroke.

7. The method of claim 1, wherein the condition comprises a normalization of the magnitude of the gradient magnitude of the image.

8. A system, comprising:
   a processor; and
   a memory that stores executable instructions that, when executed by the processor, facilitate performance of operations, comprising:
      facilitating determining a subset of strokes of a set of strokes related to an image, wherein the subset of strokes is determined by determining a closest vertex of a stroke to a neighboring stroke within the image, and wherein the stroke snaps to an image edge, of the image, that is parallel to a stroke direction of the stroke resulting in the stroke being moved near to the image edge;
      facilitating recording a distance between the stroke and the neighboring stroke;
      facilitating determining the subset of strokes based on a condition related to the distance between the stroke and the neighboring stroke being determined to have been satisfied; and
      facilitating selecting another stroke associated with the subset of strokes, other than the stroke.

9. The system of claim 8, wherein a snapping candidate comprises an edge weight.

10. The system of claim 9, wherein the spatial layout of the subset of strokes is determined to be similar to another spatial layout of another subset of strokes according to a defined similarity criterion.

11. The system of claim 8, wherein the operations further comprise:
    determining a snapping cost based on summing edge weights associated with snapping candidates.

12. The system of claim 8, wherein the operations further comprise:
    determining a mesh deformation associated with the closest vertex of the stroke to the neighboring stroke.

13. The system of claim 8, wherein the operations further comprise:
    determining a mesh deformation associated with the subset of strokes.

14. The system of claim 8, wherein the operations further comprise:
    determining a balancing weight based on a summation of a snapping cost, a deformation of the closest vertex, and another deformation of the subset of strokes.

15. A non-transitory computer readable medium having instructions stored thereon that, in response to execution, cause a system comprising a processor to perform operations, comprising:
    determining a subset of strokes of a set of strokes related to an image comprising determining a closest vertex of a stroke to a neighboring stroke within the image, wherein the stroke snaps to an image edge, of the image, that is parallel to a stroke direction of the stroke resulting in the stroke being positioned near the image edge;
    recording a distance between the stroke and the neighboring stroke;

determining the subset of strokes based on a condition related to the distance between the stroke and the neighboring stroke being determined to have been satisfied;

triangulating an image plane based on a stroke vertex of a set of stroke vertices of the set of strokes; and determining a mesh deformation based on a position of the subset of strokes, wherein the mesh comprises connecting the stroke vertex to another stroke vertex based on a spatial neighboring criterion.

16. The non-transitory computer readable medium of claim 15, wherein the operations further comprise:

adjusting the position of the subset of strokes based on the mesh deformation.

17. The non-transitory computer readable medium of claim 15, wherein the mesh deformation is a two-dimensional deformation.

18. The non-transitory computer readable medium of claim 15, wherein the operations further comprise:

preserving an original layout of an unadjusted stroke.

19. The non-transitory computer readable medium of claim 15, wherein the mesh deformation is associated with the closest vertex of the stroke to the neighboring stroke.

20. The non-transitory computer readable medium of claim 15, wherein the mesh deformation is associated with the subset of strokes.

\* \* \* \* \*